April 26, 1949.  E. S. LANK  2,468,562
ROTARY TOOL FOR CUTTING CIRCULAR GROOVES
Filed Aug. 13, 1945  3 Sheets-Sheet 1

Inventor
Everett S. Lank
By James P. Burns
Attorney

April 26, 1949.  E. S. LANK  2,468,562
ROTARY TOOL FOR CUTTING CIRCULAR GROOVES
Filed Aug. 13, 1945  3 Sheets-Sheet 2
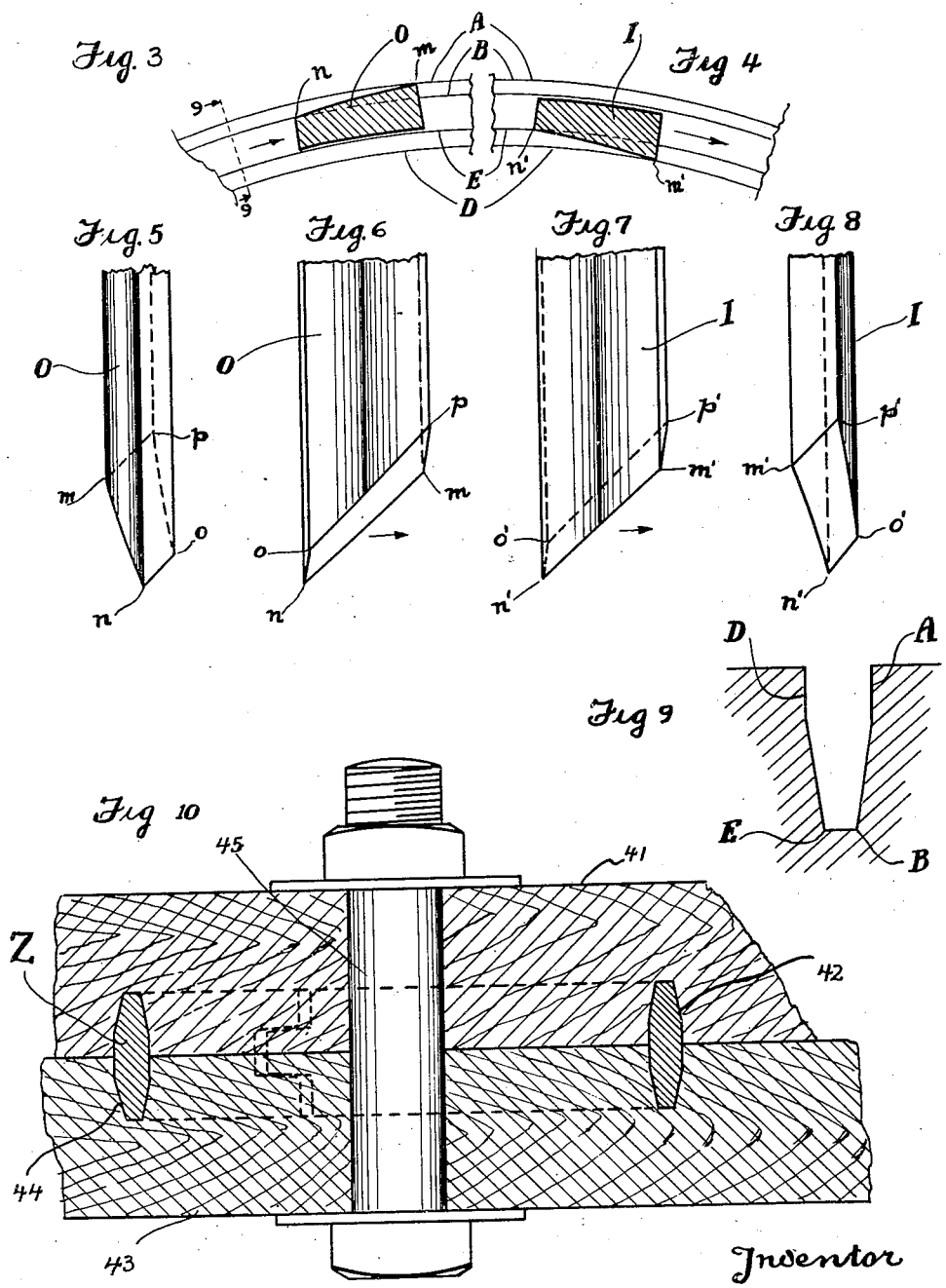

April 26, 1949.  E. S. LANK  2,468,562
ROTARY TOOL FOR CUTTING CIRCULAR GROOVES
Filed Aug. 13, 1945  3 Sheets-Sheet 3
Fig. 11
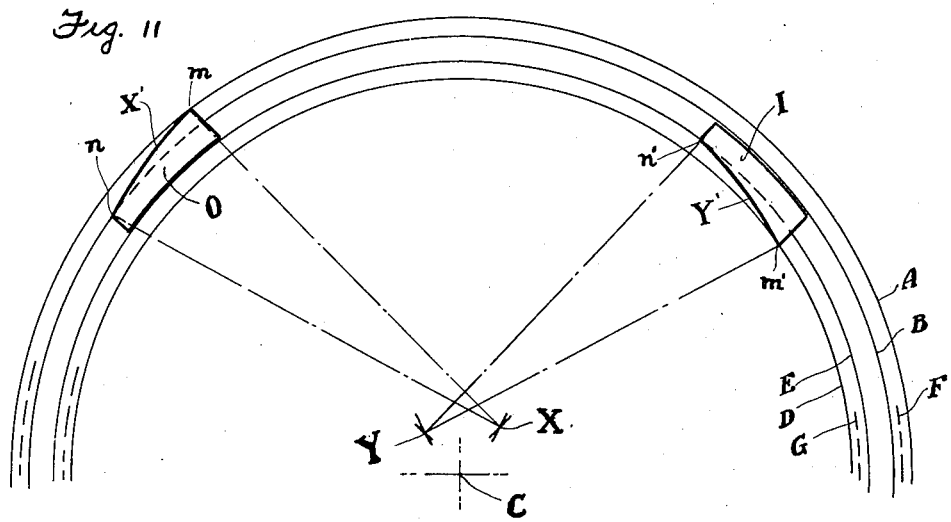
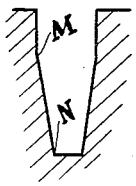
Fig. 12
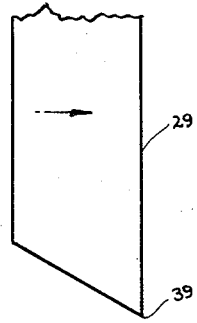
Fig. 14
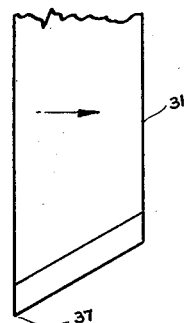
Fig. 15
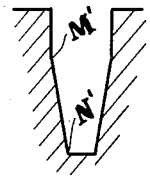
Fig. 13
Inventor
Everett S. Lank
By James P. Burns
Attorney Patented Apr. 26, 1949

2,468,562

UNITED STATES PATENT OFFICE 2,468,562

ROTARY TOOL FOR CUTTING CIRCULAR GROOVES

Everett S. Lank, Green Acres, Md., assignor to Timber Engineering Company, Washington, D. C., a corporation of Delaware Application August 13, 1945, Serial No. 610,581

5 Claims. (Cl. 144—218)

This invention relates to an improved groove cutting tool. More particularly, it concerns a tool for cutting circular grooves having converging, substantially straight, side walls adapted to be cut in the faces of timbers used in fabricating a timber joint. In such construction, grooves are cut in the faces of the timbers for receiving a circular timber connector.

In the instant case, the invention is primarily concerned with a groove cutting tool for use in cutting grooves conforming to the contour of beveled rings to be received therein, and specifically for the cutting of grooves having opposed walls that, at least in part, converge along substantially straight lines toward the bottom of the groove so that the beveled surfaces of the rings will lie flat against the walls of the groove.

Tools have heretofore been provided for cutting circular grooves having straight cylindrical side walls. No satisfactory tool, however, has heretofore been devised for expeditiously cutting ring-receiving grooves having converging tapered walls, and it is, therefore, a broad object of the present invention to provide a novel tool adapted for this general purpose.

The tool of the present invention is particularly well adapted for cutting circular grooves to receive split rings such as more specifically disclosed in U. S. Patent No. 2,377,156.

It is a more specific object of the invention to provide a cutting tool for cutting circular grooves having converging, substantially straight, side walls, which is so constructed and designed as to have a slicing action as well as to run freely and coolly without the development of any substantial friction.

It is a further specific object of the invention to provide a circular groove cutting tool, the cutting blades of which are so formed that as each blade is worn away and ground off by repeated sharpening, the cutting edge will always cut a uniform and unmodified pattern, thereby producing grooves of uniform cross-sectional dimension throughout the life of the cutting blades.

It is still a further specific object of the invention to provide circular groove side wall cutting blades having working faces and cutting edges of such configuration that no part of the blade following any point along the cutting edge thereof has frictional contact with the groove wall.

Other and more detailed objects of the invention will be made apparent as the description proceeds, which is given with reference to the accompanying drawings forming a part hereof, and wherein:

Fig. 3 is a diagrammatic fragmentary view showing a cross section through the cutting blade for cutting the outside wall of the circular groove and indicating the position occupied by that blade in the groove;

Fig. 4 is a view similar to Fig. 3, but showing the blade for cutting the inside wall of the groove in cross section and indicating its position in the groove;

Fig. 5 is a fragmentary rear elevation of the cutting blade for cutting the outside wall of the groove as seen from the trailing edge thereof;

Fig. 6 is a fragmentary side elevation of the blade for cutting the outside wall of the groove as seen when looking radially outward from the center of the tool;

Fig. 7 is a fragmentary side elevation of the cutting blade for cutting the inside wall of the groove as seen when looking radially outward from the center of the tool;

Fig. 8 is a fragmentary front elevation of the blade for cutting the inner wall of the groove as seen from the leading edge thereof;

Fig. 9 is a transverse sectional view of a groove produced by the tool of the present invention and as seen in the direction of the arrows along the line 9—9 of Fig. 3;

Fig. 10 is a sectional view through a timber joint embracing complementary opposed grooves as cut by the tool of the present invention and in which there is shown positioned a double beveled metallic split ring;

Figs. 11, 12 and 13 are diagrammatic views illustrating one exemplary manner for determining the contour of the working faces of the cutting blades for the tool;

Fig. 14 is a detail fragmentary side elevation view of a suitable chip lifter for use with the tool of the present invention; and Fig. 15 is a detail fragmentary side elevation view of one of the outlining spurs adapted for use with the tool of the present invention.

Figure 1:
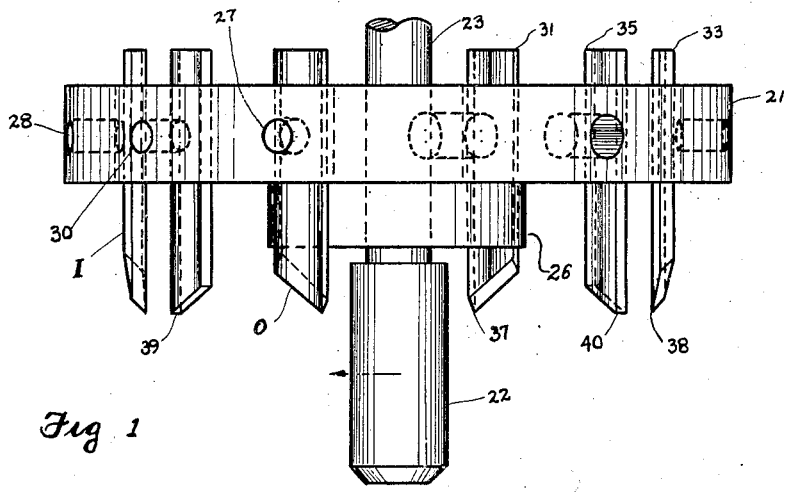
Fig. 1 is a side elevation of the circular groove cutting tool of the invention with the upper end of the pilot pin broken away.
Figure 2:
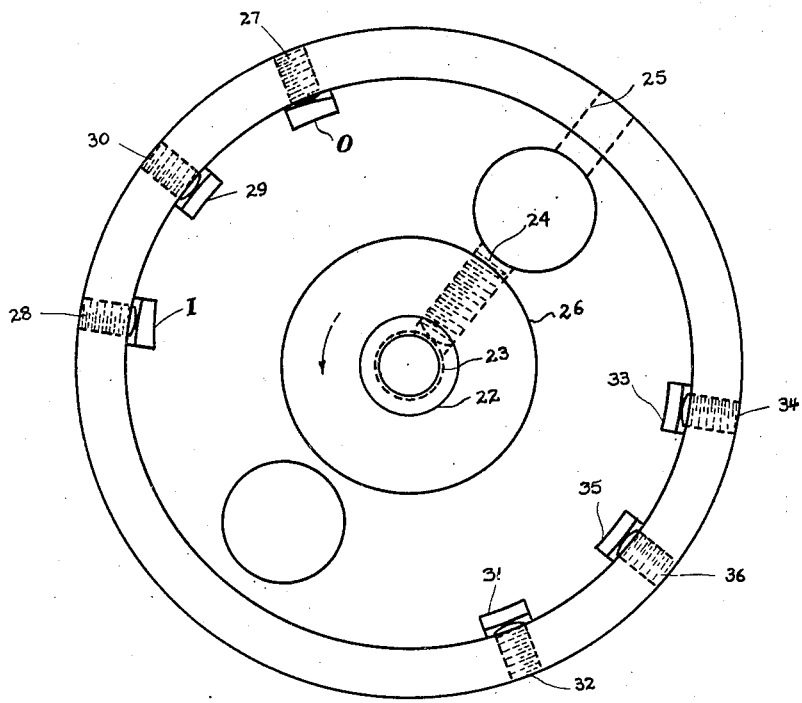
Fig. 2 is a bottom plan view of the circular groove cutting tool shown in Fig. 1.

Referring to the drawings, there is shown in Fig. 1 and 2 a rotating head 21 having centrally positioned therein the pilot member 22 having a reduced upper portion 23 which is locked in a central opening in the rotating head 21 by the set screw 24, which is adapted to be inserted through the radial opening 25 in the rim of the rotating head 21. The upper end 23 of the pilot member 22 is equipped with conventional means (not shown) for attachment to a suitable source of power for driving the tool at high speed of the order of 3000 to 3500 R. P. M.

The lower face of the rotating head 21 is provided with a downwardly extending central boss 26 of substantially greater diameter than the pilot member 22, which serves not only to increase the mass and strengthen the tool, but also as a stop for automatically limiting the depth of the grooves cut by the tool.

The different cutting elements of the tool can perhaps best be described by reference to the work that they respectively do in the cutting of a circular groove.

Referring to Fig. 1, the blade indicated generally at O cuts the outside wall of the circular groove and is held in a suitable receiving socket in the rotating head 21 by the radially extending locking screw 27. The blade indicated generally at I is designed to cut the inside wall of the circular groove and to be held in its receiving socket in the rotating head 21 by the radial locking screw 28. Interposed between the blades O and I is a suitable chip lifter 29 held in position in its receiving socket in the rotating head 21 by the radial locking screw 30.

It will be observed that the cutting blades O and I for cutting the outside and inside walls, respectively, of the circular groove are both positioned on one side of the axis of rotation of the tool. This is done so that the radial thrusts of these blades, induced by their tendency to be forced away from the walls being respectively cut thereby, will compensate each other.

Diametrically opposite the blade O there is positioned an outlining spur 31 held in its receiving socket in the rotating head 21 by the radial locking screw 32, and diametrically opposite the blade I is a second outlining spur 33 held in its receiving socket in the rotating head 21 by the radial locking screw 34. Intermediate the outlining spurs 31 and 33, and diametrically opposite the chip lifter 29, is a second chip lifter 35 held in its receiving socket in the rotating head 21 by the radial locking screw 36.

Referring to Figs. 3 and 4, the blades O and I are shown in the positions they respectively assume when a groove such as shown in Fig. 9 is being cut. In Figs. 3 and 4, the circle A defines the top of the outer wall of the groove. The circle B defines the bottom of the outer wall of the groove. As indicated in Fig. 11, these circles are drawn about the center C, indicating the center of rotation of the tool. The circle D of Figs. 3 and 4 indicates the top of the inside wall of the groove, and the circle E indicates the bottom of the inside wall of the groove. The leading point of the cutting edge of the blade O is indicated at $m$ and the trailing point of the cutting edge of the blade O is indicated at $n$ in Figs. 3, 5 and 6.

It will be observed that the ground face of the blade O, defined by $m$, $n$, $o$, $p$, is a plane surface. Thus, the cutting edge $m$, $n$, takes the form of a curve rather than a straight line for reasons that will be presently pointed out.

Referring to the blade I in Fig. 4, the leading point of the cutting edge is designated $m'$, and the trailing point of the cutting edge is designated $n'$. Whereas the working face of the blade O extending between the points $m$ and $n$ is in the form of a convex surface, the working face of the blade I extending between points $m'$ and $n'$ is in the form of a concave surface. The ground surface at the lower end of the blade I defined by the reference characters $m'$, $n'$, $o'$, $p'$, is a plane surface. It will be observed that the blade O is of uniform cross sectional dimension throughout its vertical length that likewise the blade I is of uniform cross sectional dimension throughout its vertical length.

Coming specifically to the development of the contour of the cutting edges of the blades O and I, it will be appreciated that if the cutting edge $m'$, $n'$ of the blade I, for example, were in the form of a straight line, the rotating head 21 upon rotation would cause such straight line cutting edge to generate a curved path, producing instead of a true conical surface a curved surface which would not lie flat against the beveled face of a metal ring such as the ring shown in Fig. 10.

To avoid this serious defect there is provided in accordance with the present invention, a blade having a working face contour such that when the blade is sharpened there is provided a curved cutting edge which, upon rotation of the rotating head 21, will generate a substantially true conical surface which will lie flush against the beveled face of a metal ring.

A blade provided with a cutting edge extending on a complex curve that is geometrically exact in its capacity to generate a true conical surface is both difficult and expensive to manufacture. For practical purposes, within the range of dimensions generally encountered in the use of tools for cutting circular grooves for timber connectors, the working face of the blade, which, when sharpened, provides the curved cutting edge, may be made circular on a radius that is approximately the radius of the groove wall without introducing objectionable variations from a true conical surface.

One exemplary practical method for arriving at the contour of the working faces of the cutting blades, which, when the blades are sharpened, provide the cutting edges thereof, is exemplified in Fig. 11.

Referring to Fig. 11, let C represent the axis of rotation of the tool about which the circular groove is cut. Let A represent the circle in which the vertical portion of the outer wall of the groove lies. Let B represent the circle which constitutes the line of intersection between the bottom of the groove and the beveled portion of the outside wall thereof. Let F represent a circle having C as its center and having a diameter which is the average of the diameters of circles A and B. Place points $m$ and $n$ on circles A and B, respectively, circumferentially spaced apart a sufficient distance to give the requisite strength to the cutting blade. Then find the center of a circle, the arc of which will pass through points $m$ and $n$, having a radius the same as that of the circle F. This center will be found to be as indicated at X. Using X as the center and the diameter of circle F as the radius, the arc X' can be drawn through points $m$ and $n$, giving a suitable contour for the working face of the blade O for cutting the outside wall of the groove. The inner surface of the blade O may be in the form of an arc of a circle having the center C, and is positioned to have no frictional contact with the inside wall of the groove.

The contour of the working face of the blade I for cutting the inside wall of the groove can be arrived at in a similar manner. Let D represent the circle in which the vertical portion of the inner wall of the groove lies. Let E represent the circle constituting the line of intersection between the bottom of the groove and the beveled portion of the inside wall thereof. Let G represent a circle having as its diameter the average of the diameters of circles D and E. Place points $m'$ and $n'$ on the circles D and E, respectively, circumferentially spaced a distance apart to give the requisite strength for the blade I. Locate the center of a circle, the arc of which passes through points $m'$ and $n'$, and which has the same radius as the circle G. This center will be found to be as indicated at Y. Using Y as the center and the diameter of the circle G as the radius, draw the arc of the circle Y' which gives a suitable contour for the working face of the blade I for cutting the inner wall of the groove. The outside surface of the blade I may be in the form of an arc of a circle having the center C, and is positioned to have no frictional contact with the outer wall of the groove.

Referring to the projection of the groove shown in Fig. 12, it will be appreciated that the leading point $m$ of the blade O follows the point of intersection M between the vertical portion and the beveled portion of the outside wall of the groove, whereas the trailing point $n$ follows the line of intersection N between the bottom of the groove and the beveled portion of the outside wall thereof.

Referring to the projection of the groove shown in Fig. 13, it will be appreciated that the leading point $m'$ of the blade I follows the line of intersection M' between the vertical portion and the beveled portion of the inside wall of the groove, and likewise that the trailing point $n'$ of the cutting edge of the blade I follows the line of intersection N' between the bottom of the groove and the beveled portion of the inside wall thereof.

Thus the leading point $m$ of the cutting edge of the blade O is spaced from the axis of rotation of the tool a distance equal to the radius of a circle defining the top of the beveled surface of the outside wall of the groove to be cut and the trailing point $n$ is spaced from the axis of rotation of the tool a distance equal to the radius of a circle defining the bottom of the beveled surface of the outside wall of the groove to be cut. In a similar manner the leading point $m'$ and the trailing point $n'$ of the blade I are spaced from the axis of rotation of the tool by distances equal respectively to the radius of a circle defining the top and the radius of a circle defining the bottom of the beveled surface of the inside wall of the groove to be cut.

The depth of the beveled wall portion of the groove is determined by the vertical distance between the leading point $m$ and the trailing point $n$ of blade O, and the vertical distance between the leading point $m'$ and the trailing point $n'$ of the blade. It will thus be observed that the angle of inclination at which the cutting edge $m$—$n$ of blade O and the cutting edge $m'$—$n'$ of blade I extend downwardly from the forward face of these blades, will depend on the circumferential extent of the blade body and upon the depth of the beveled portion of the groove desired to be cut. Conveniently, the blades may be so formed that the cutting edges thereof extend upwardly from the trailing points at an angle of approximately 45° to the bottom of the groove. As has been earlier described, the cutting edge of each cutting blade is produced by grinding a plane surface on the lower end of the blade oblique to the axis of the blade and passing through the cutting edge. The dihedral angle between this plane surface and the working face of the blade produces the cutting edge, and this angle should be so proportioned that the blade will cut by a slicing action and likewise so that the blade will have a reasonable service life. This angle may well lie within the limits of from 30° to 60°.

The precise dimensions of the cutting blades O and I will be varied depending upon the diameter and other dimensions of the circular groove to be cut. It will be observed, however, that the leading point of the cutting edge of each blade is higher than the training point thereof by a distance equal to the vertical extent of the beveled surface of the groove wall to be cut thereby.

It will be observed, more particularly by reference to Figs. 3 and 4, that no metal of the cutting blade following any given point along the cutting edge thereof has frictional contact with the wall of the groove being cut. Due to the particular configuration and arrangement of the cutting blades, there is virtually no generation of heat through frictional contact of the blades with the wood even at speeds of the order of 3000 to 3500 R. P. M. The fact that the cutting edges of the blades incline downwardly from their leading points to their trailing points causes the tool to cut the wood with a slicing action, which gives an unusually smooth surfaced wall to the groove and completely avoids any splitting out or splintering incident to the cutting of a groove.

Thus far, little has been said about the outlining spurs 31 and 33 or the chip lifters 29 and 35 (Fig. 1). These elements do not enter into the shaping of the side walls of grooves cut by the grooving tool of the present invention. The outlining spur 31 has its lower end sharpened by being ground along a plane surface oblique to its axis. The transverse dimension of the outlining spur 31 is no greater than the narrowest portion of the groove to be cut. Only the trailing point 37 has contact with the wood, and this point functions as an outlining spur moving along the line of intersection N (Fig. 12) between the beveled portion of the outside wall of the groove and the bottom thereof. This outside outlining spur is shown in detail in Fig. 15. The outlining spur 33 is precisely of the same construction as the outlining spur 31 except that the ground surface at its lower end is so ground that its trailing point 38 follows the line of intersection N' (Fig. 13) between the beveled portion of the inside wall of the groove and the bottom thereof. The chip lifters 29 and 35 are identical in construction and constitute the only elements of the tool whose leading points are located at a lower level than their trailing points. The leading point 39 of chip lifter 29 and the leading point 40 of the chip lifter 35 move along the bottom of the groove and function to chisel out and remove from the groove the cuttings produced by blades O and I which are thrown to the center of the groove. The transverse dimension of the chip lifters 29 and 35, like the transverse dimension of the outlining spurs 31 and 33, never exceeds the narrowest portion of the groove and thus none of these elements ever has frictional contact with the side walls of the groove being cut. A fragmentary detail of the chip lifter 29 is shown in Fig. 14.

As stated at the outset of this specification, one special use of the tool is the cutting of grooves for reception of a split ring of the type shown in U. S. Patent No. 2,377,156. A timber joint embodying grooves cut by the tool of the present invention with a split ring positioned therein is illustrated in Fig. 10, wherein the upper timber element 41 is provided with a groove 42 adapted to receive one-half of the vertical extent of the metal ring Z, whereas the lower timber element 43 is provided with a groove 44 to receive the lower half of the vertical extent of the ring Z which is tightly seated in the grooves with its beveled surfaces lying flat against the complementary beveled surfaces of the grooves 42 and 44 to provide an exceptionally practical and strong timber connection, the entire joint being held together by the transverse centrally positioned bolt 45 which fits in the hole followed by the pilot member 22 of the tool of the present invention.

While the invention has been particularly described with reference to the cutting of grooves having converging side walls throughout at least a portion thereof, it will be appreciated that by substituting a conventional vertical cutting blade, such as used in cutting grooves having cylindrical side walls, for one of the blades O or I, the tool of the present invention is adapted to form grooves having one vertical side wall with an opposed beveled side wall.

The foregoing description is given by way of explanation and illustration of the invention, and not in limitation thereof, the scope of the invention being that defined by the subjoined claims.

What I claim is:

1. A grooving tool comprising a rotary head, at least one blade formed from longitudinally straight stock positioned parallel to the axis of rotation of said head for cutting the outside wall of a circular groove in a flat surface and at least one blade formed from longitudinally straight stock positioned parallel to the axis of rotation of said head for cutting the inside wall of the circular groove in a flat surface, at least one of the said blades shaped to have a slicing action with the leading point of the cutting edge thereof higher than the trailing point of the cutting edge thereof by a distance equal to the vertical extent of the beveled surface to be cut, and with the leading point of the cutting edge spaced from the axis of rotation of the tool a distance equal to the radius of a circle defining the top of the beveled surface to be cut, and the trailing point of the cutting edge spaced from the axis of rotation of the tool a distance equal to the radius of a circle defining the bottom of the beveled surface to be cut.

2. A grooving tool comprising a rotary head, at least one blade formed from longitudinally straight stock positioned parallel to the axis of rotation of said head for cutting the outside wall of a circular groove and at least one blade formed from longitudinally straight stock positioned parallel to the axis of rotation of said head for cutting the inside wall of a circular groove, the cutting edge of each of said wall cutting blades shaped to have a slicing action with the leading point of the cutting edge higher than the trailing point of the cutting edge by a distance equal to the vertical extent of the beveled surface to be cut, and with the leading point of the cutting edge spaced from the axis of rotation of the tool a distance equal to the radius of a circle defining the top of the beveled surface to be cut thereby, and the trailing point of the cutting edge spaced from the axis of rotation of the tool a distance equal to the radius of a circle defining the bottom of the beveled surface to be cut thereby.

3. A grooving tool comprising a rotary head, one blade formed from longitudinally straight stock positioned parallel to the axis of rotation of said head for cutting the outside wall of a circular groove and one blade formed from longitudinally straight stock positioned parallel to the axis of rotation of said head for cutting the inside wall of a circular groove, the wall cutting edges of each of said wall cutting blades shaped to have a slicing action with the leading point of the cutting edge higher than the trailing point of the cutting edge by a distance equal to the vertical extent of the converging side wall portion to be cut, the leading point of the cutting edge of said blade for cutting the outside wall being spaced substantially further from the axis of rotation of the tool than the trailing point thereof, and with the leading point of said blade for cutting the inside wall spaced nearer the axis of rotation of the tool than the trailing point thereof.

4. A grooving tool comprising a rotary head, one blade formed from longitudinally straight stock positioned parallel to the axis of rotation of said head for cutting the outside wall of a circular groove and one blade formed from longitudinally straight stock positioned parallel to the axis of rotation of said head for cutting the inside wall of a circular groove, the wall cutting edges of each of said wall cutting blades shaped to have a slicing action with the leading point of the cutting edge higher than the trailing point of the cutting edge by a distance equal to the vertical extent of the converging side wall portion to be cut, the leading point of the cutting edge of said blade for cutting the outside wall being spaced substantially further from the axis of rotation of the tool than the trailing point thereof, and with the leading point of said blade for cutting the inside wall spaced nearer the axis of rotation of the tool than the trailing point thereof, both of said cutting blades being positioned on one side of the axis of rotation of the tool.

5. A grooving tool comprising a rotary head, one blade formed from longitudinally straight stock positioned parallel to the axis of rotation of said head for cutting the outside wall of a circular groove and one blade formed from longitudinally straight stock positioned parallel to the axis of rotation of said head for cutting the inside wall of a circular groove, the wall cutting edges of each of said wall cutting blades shaped to have a slicing action with the leading point of the cutting edge higher than the trailing point of the cutting edge by a distance equal to the vertical extent of the converging side wall portion to be cut, the leading point of the cutting edge of said blade for cutting the outside wall being spaced substantially further from the axis of rotation of the tool than the trailing point thereof, and with the leading point of said blade for cutting the inside wall spaced nearer the axis of rotation of the tool than the trailing point thereof, each of said cutting edges extending in the form of a curve from its leading point to its trailing point whereby no metal of the blade following any point on the cutting edge thereof will have frictional contact with the grooved wall being cut thereby.

EVERETT S. LANK.

REFERENCES CITED

The following references are of record in the file of this patent:

UNITED STATES PATENTS

| Number | Name | Date |
|---|---|---|
| 87,282 | Odholm | Feb. 23, 1869 |
| 94,870 | Clark | Sept. 14, 1869 |
| 269,315 | Orum | Dec. 19, 1882 |
| 478,381 | Taft | July 5, 1892 |
| 529,114 | Ettinger | Nov. 13, 1894 |
| 668,734 | Hosier | Feb. 26, 1901 |
| 914,966 | Mayer et al. | Mar. 9, 1909 |